J. A. TRUE.
COTTON-SEED AND CORN PLANTER.

No. 186,963. Patented Feb. 6, 1877.

UNITED STATES PATENT OFFICE.

JOHN A. TRUE, OF MARION, ALABAMA.

IMPROVEMENT IN COTTON-SEED AND CORN PLANTERS.

Specification forming part of Letters Patent No. 186,963, dated February 6, 1877; application filed October 26, 1876.

*To all whom it may concern:*

Be it known that I, JOHN A. TRUE, of Marion, in the county of Perry and State of Alabama, have invented certain new and useful Improvements in Cotton Seed and Corn Planters; and I do hereby declare the following to be a full, clear, and exact description of the invention, such as will enable others skilled in the art to which it pertains to make and use it, reference being had to the accompanying drawings, which form part of this specification.

My invention relates to an improvement in cotton-seed and corn planters; and it consists in the arrangement and combination of parts, that will be more fully described hereinafter, whereby the hopper for cotton-seed is made to rock as the planter moves forward. It also further consists in the devices by which the corn-hopper is made to rock, and the peculiar form of the harrow or cutters, that are secured to the frame, all of which will be more fully set forth in the accompanying specification.

Figure 1:
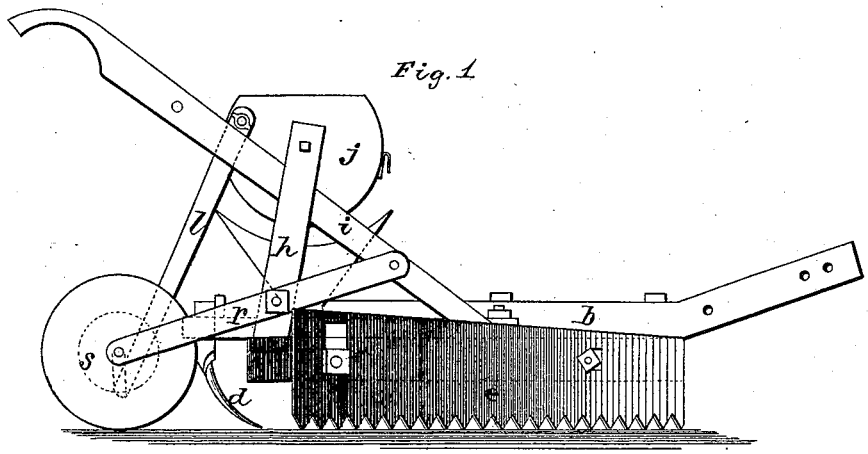
Figure 2:
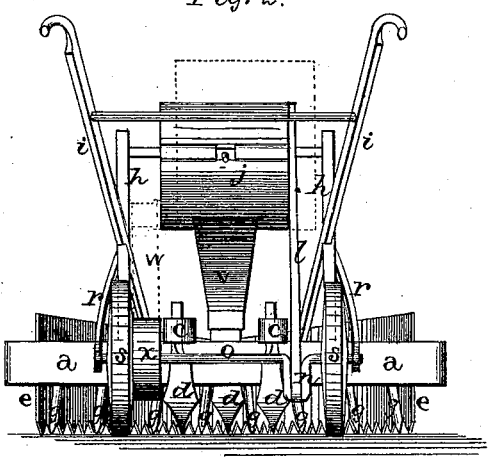
Figure 3:
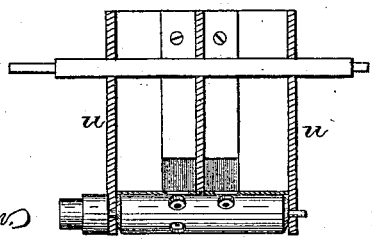

Figure 1 is a side elevation of my invention. Fig. 2 is a rear view of the same. Fig. 3 is a section of the corn-seed box alone.

$a$ represents a triangular frame, of any suitable description, upon the top of which is secured the beam $b$, and upon each side of it the two shorter parallel beams $c$. Through the rear ends of these three beams are secured the plows or shovels $d$, the front one of which serves to open the furrow, while the other two may serve to cover the grain or seed as fast as dropped. Projecting downward from the outside of the frame $a$ on two sides are the serrated or toothed plates $e$, which are made adjustable up and down, so as to cut to any desired depth. The lower edges are made like the teeth of saws, so that they will cut up and completely remove every weed from in front of the machine as it is drawn forward, leaving a clear ground for the planting. These teeth also help the harrow-teeth $g$ to harrow the ground. Rising from the rear beam of the frame are two standards, $h$, which are braced rigidly in position by the two handles $i$. In the upper end of these standards is journaled the cotton-seed box $j$, of any suitable description, which has attached to one side a connecting-rod, $l$, which inclines backward, and has its lower end fastened to the crank $n$ on the shaft $o$. This shaft is journaled in the rear ends of the two braces $r$, which are fastened to the sides of the standards and handles, and their front ends so formed that the two wheels $s$ on the shaft can be adjusted up or down, to suit the ground. The shaft on which the seed-box $j$ rocks is stationary, and is provided with stirrers, to prevent the seed from clogging. The seed falls through the opening in the bottom of the box into the funnel $v$, and from thence into the furrow just back of the plow.

When it is desired to plant corn instead of cotton-seed the cotton-seed box $j$ is taken off and the corn-box $u$ put in its place. Instead of working the corn-box by means of the connecting-rod and crank, a belt, $w$, is passed from over the pulley $x$ on the shaft up over the pulley on the box-shaft, which is thus given its required motion to plant the seed evenly and regularly.

Having thus described my invention, I claim—

1. In combination with the rearwardly-slanting sides of a cultivator-frame, the metallic plates $e$, secured thereto, and having their lower edges made into saw-teeth, substantially as shown.

2. The combination, in a corn and cotton-seed planter, of a suitable frame, $a$, and the saw-toothed plates $e$, for preparing the ground, the standards $h$, braces $r$, shaft $o$, having the crank $n$, pulley $x$, and wheels $s$, the parts being arranged for operation substantially as shown.

3. The combination of a triangular frame, $a$, provided with harrow-teeth $g$, with the saw-toothed plates $e$, substantially as described, whereby the grass and weeds are first cut away and the ground harrowed at the same time.

In testimony that I claim the foregoing I have hereunto set my hand this 28th day of September, 1876.

J. A. TRUE.

Witnesses:
T. A. GIVHAN,
W. H. SMITH.